US006662171B1

United States Patent
Goertz

(10) Patent No.: US 6,662,171 B1
(45) Date of Patent: Dec. 9, 2003

(54) AUTOMATED DIAGNOSTIC METRIC LOOP

(75) Inventor: Michael David Goertz, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 609 days.

(21) Appl. No.: 09/699,881

(22) Filed: Oct. 30, 2000

(51) Int. Cl.[7] .................................................. G06N 5/02
(52) U.S. Cl. .......................................... 706/45; 707/202
(58) Field of Search ............................ 706/45; 707/202; 714/2, 3

(56) References Cited

U.S. PATENT DOCUMENTS

| 5,740,347 A | * | 4/1998 | Avidian | 714/33 |
| 6,081,812 A | * | 6/2000 | Boggs et al. | 707/202 |
| 6,151,683 A | * | 11/2000 | Wookey | 714/2 |
| 6,158,022 A | * | 12/2000 | Avidian | 714/33 |

OTHER PUBLICATIONS

Kiwon Chong, Pei Hsia, Diagnostic system for distributed software: A relational database approach, Proceedings of the 7th international conference on Software engineering , Mar. 1984, pp. 30–40.*

Mahamat Guiagoussou, Said Soulhi, Implementation of a diagnostic and troubleshooting multi–agent system for cellular networks, International Journal of Network Management, vol. 9 Issue 4, Aug. 1999, pp. 221–237.*

* cited by examiner

Primary Examiner—Wilbert L. Starks, Jr.

(57) ABSTRACT

A computer system that collects diagnostic information from diagnostic software as well as knowledgepath information about the path a user uses in searching a knowledgebase and provides this information electronically to a call center where the information is stored in a database along with a textual description of the problem. Correlation software analyzes data from multiple incidents to correlate the multiple incidents into common problem definitions.

12 Claims, 4 Drawing Sheets

AUTOMATED DIAGNOSTIC METRIC LOOP

CROSS REFERENCE TO RELATED APPLICATIONS

This application is related to application Ser. No. 09/470,848 of Martinka, et al., filed Dec. 23, 1999, entitled "Apparatus for a Multi-Modal Ontology Engine".

TECHNICAL FIELD

This invention relates to computer systems and more particularly to using computer systems to diagnose problems within other systems.

BACKGROUND OF THE INVENTION

Diagnosis of most problems is typically a human centered process. When diagnosing problems within computer systems, however, diagnostic software is often available to assist with the diagnosis. For some problems the diagnostic software is totally sufficient and completely diagnoses the problem and recommends a solution. For example, some software available to assist hardware repair will identify the faulty circuit so completely that a repair person then only has to replace the identified circuit to correct the defect. Typically, however, diagnostic software can only completely solve problems that involve defective hardware. When the problem also involves defective software, or a problem of the interaction between software and hardware, or a problem of interaction between multiple software components, diagnostic software is usually insufficient to completely resolve the problem.

Over the past two or three decades, problems and their solutions have been collected into databases called knowledgebases. Along with the collection of problems and solutions, knowledgebase systems include search software to search the knowledgebase in order to match a knowledgebase problem description with the problem description supplied by the user to return a solution to the problem from the solutions stored in the knowledgebase. Input to the search software is typically human supplied, and comprises words and phrases which can be used to search the text of the knowledgebase, or used within artificial intelligence software to perform a more comprehensive search of the symptoms from the knowledgebase. These knowledgebases are often created for use at support enters by manufacturers of hardware or software, and are sometimes also made available to users of he hardware or software through distribution on electronic media or through the internet.

The most common problem solving method, however, is a support center provided by the hardware or software manufacturer. When a user calls, the user describes the problem to a support representative, who may ask additional questions of the user and then recalls a solution from the knowledgebase, recalls a solution from their own experience, or recalls a solution using a combination of these techniques, to provide a problem solution. Typically the support representative will also enter information into a call database which tracks the time spent solving the problem, as well as keeping a textual description of the problem to be entered into the call database. It is possible, although usually quite difficult, to correlate different calls in the call database to determine that these different calls were the result of the same problem. This correlation is almost exclusively done by human analysis, and the results are then put into the knowledgebase so that the support engineer can search for solutions to future problems. This correlation, however, is very time consuming and intuitive, therefore it is seldom done with much efficiency. That is, most of the problems in the call database are not correlated and are often not readily available to help resolve future problems.

One of the problems with knowledgebases is that when the knowledgebase is available to the user, the efforts spent by the user in searching the knowledgebase are not available for use in analysis of the problem. That is, the steps taken by the user in searching the knowledgebase, which often provide significant information about the problem, are not collected and thus are not available to the support representative if the user is unable to resolve the problem before calling the support representative. Further, if diagnostic software is performed in resolving the problem, the results of the diagnostic software are not collected and are not made available to a support representative.

There is need in the art then for a method of collecting information, such as diagnostic software derived information, or search software derived information, to assist in resolving a problem. There is further need in the art for a system to collect this information and use this information in correlating problem descriptions from multiple sources into a single problem description and solution. The present invention solves these and other needs in the art.

Application Ser. No. 09/470,848 of Martinka, et al., filed Dec. 23, 1999, entitled "Apparatus for a Multi-Modal Ontology Engine" is hereby incorporated by reference for all that is disclosed and taught therein.

DISCLOSURE OF INVENTION

It is an aspect of the present invention to combine machine collected data with human collected data about problems within computer systems.

It is another aspect of the invention to collect search information about searches of a knowledgebase as part of the machine collected data.

Another aspect of the invention is to collect machine diagnostic software information as another part of the machine collected data.

Another aspect of the invention is to correlate multiple machine collected descriptions of a problem to determine that a single problem has been described.

Still another aspect of the invention is to derive additional knowledgebase information from the correlated multiple machine collected descriptions.

The above and other aspects of the invention are accomplished in a system that collects information from diagnostic software as well as search path information a user uses in searching a knowledgebase and provides this information electronically to a call center where the information is stored in a "datamine" database. In addition, a textual description of the problem is collected from the user by a support representative at the call center and this textual information is stored in a call database along with information about the cost of resolving the problem, such as the support representative's time. The information in the call database and the datamine database are related through a call identification number so that the two types of information remain connected. Correlation software analyzes datamine data from multiple incidents to correlate the multiple incidents into common problem definitions.

From the common problem definitions, a histogram is created that indicates the frequency of different problems, so that more resources can be spent solving more common problems and less resources spent on less common problems.

A knowledge engineer uses the correlated information from the datamine, along with the information from the call database, to determine a solution to the problem and place this solution into the knowledgebase, thus closing a feedback loop with the user who initially used the knowledgebase to try to find a solution, and also allow future users to find a solution to the problem in the knowledgebase.

DESCRIPTION OF THE DRAWINGS

The above and other aspects, features, and advantages of the invention will be better understood by reading the following more particular description of the invention, presented in conjunction with the following drawings, wherein.

BEST MODE FOR CARRYING OUT THE INVENTION

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
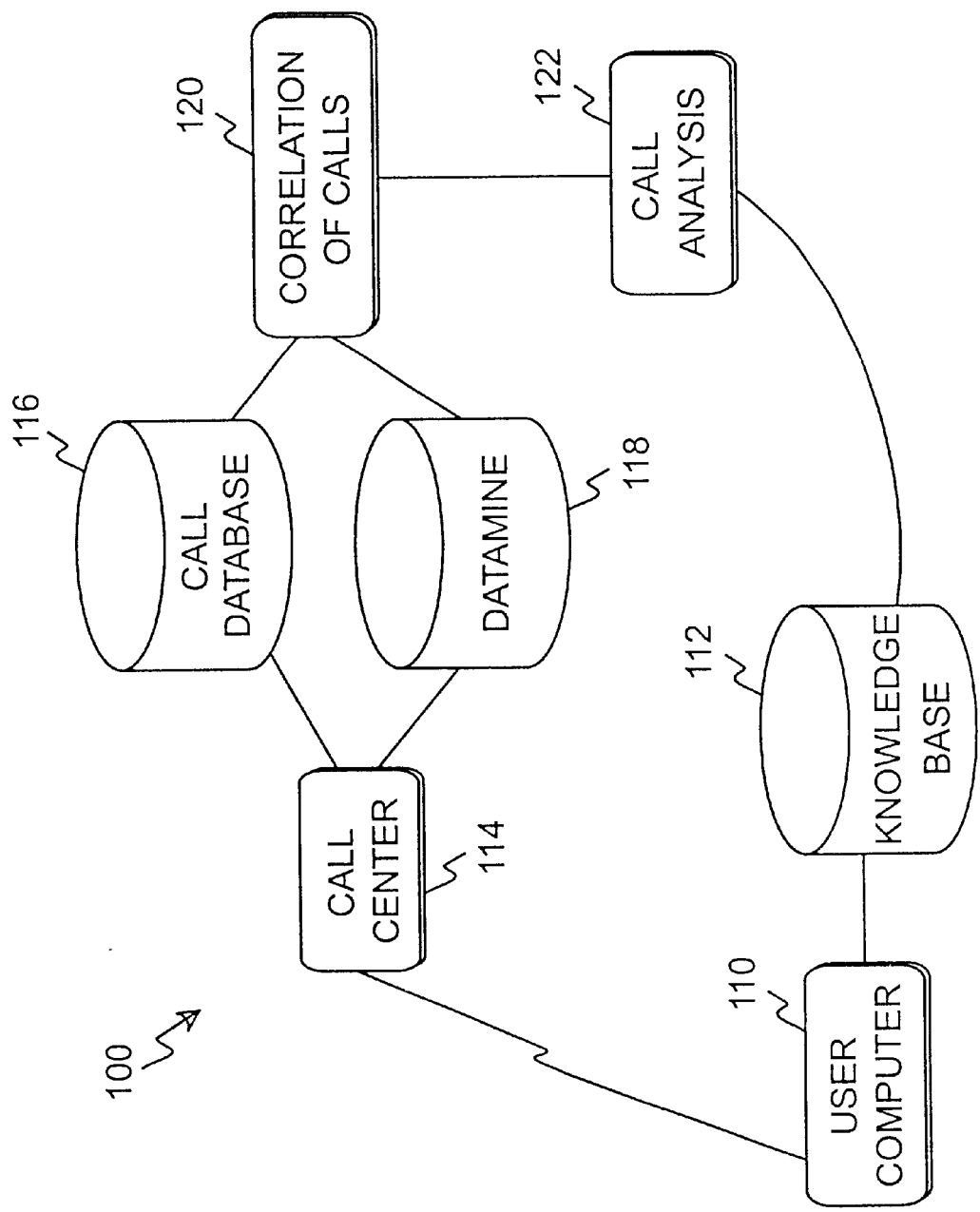
FIG. 1 shows an overview of the system of the present invention.

FIG. 1 shows an overview of the automated diagnostic metric loop of the present invention. Referring to FIG. 1, the overview diagram 100 includes a user computer system 110 which is used by the user to access a knowledgebase 112. The knowledgebase 112 may be located at the user computer 110, such as on a CD ROM, or it may be located remotely. Remote locations could include a separate computer on a network connected to the user computer, or on a remote computer accessed through the internet.

While attempting to diagnose a problem within the user computer, the user uses search software (shown below in FIG. 2) executing within the user computer 110 to access the knowledgebase 112 in an attempt to find a problem description that matches the description as the user perceives the problem.

For a description of how data is stored in the knowledgebase 112, see application Ser. No. 09/470,848 of Martinka, et al., filed Dec. 23, 1999, entitled "Apparatus for a Multi-Modal Ontology Engine" which is hereby incorporated by reference for all that is disclosed and taught therein.

While accessing the knowledgebase 112, the user, through the search software, will traverse one or more paths, or arcs, of data within the knowledgebase. The path taken by the user through the knowledgebase is called the knowledge search path. The search software will preserve the knowledge search paths traversed by the user, including all problem descriptions reviewed and discarded by the user, and the search software will save this information. By storing the data in the knowledgebase as described above, the knowledge search path provides a limited grammar description of the problem, which allows easier correlation of problem descriptions. For example, each node of the knowledge search path has a well defined premise, there are no typographical errors in the resulting knowledge search path, or at the very least the typographical errors are consistent because they all are derived from the same database, there are no synonyms for words, etc.

When the user calls a call center 114, the information saved by the search software is transmitted to the call center 114 where it is saved in a datamine database 118. In addition, a text description of the problem is given by the user to a support representative at the call center 114, and this text description is stored in a call database 116. The text description of the problem in the call database 116, and the electronic description of the problem in the datamine database 118, are connected through a call identification number so that the two types of information can be kept together throughout the rest of the process.

A correlation process 120 collects all the information from various problems in the data mine 118 and correlates all the datamine descriptions for each problem into a single problem description for each problem. As discussed above, the correlation is simplified by the limited grammar and consistency of the knowledge search path, and can be easily done by available prior art correlation methods. The correlation process 120 produces a histogram (shown below in FIG. 3) which identifies the frequency of each problem contained within the call database and the datamine database. These descriptions are then passed to a call analysis process 122 which analyzes each of the problems to produce additional entries for the knowledgebase 112, thus closing the loop.

As an example of collecting data about a problem, consider the problem of a printer failing to print data. The user might describe the problem to a support representative as "the printer did not print my document", which is not enough information to solve the problem. Prior to calling the support center, however, the user might search the knowledgebase and one of the first questions might be "Is the printer cable connected to the computer?". If the user answers yes, then the next question might be "Is the printer ready light illuminated?". If the user answers yes, the next question might be "Does the printer contain paper?". If the user answers yes, the next question might be "Did the data print?", wherein the user answers no.

The diagnostic software might analyze the printer, through the printer connection, and determine that the printer interface indicates that the printer is connected and ready.

The knowledge search path taken by the user in answering the questions, that is, the questions asked and the series of yes and no answers, and the information collected by the diagnostic software both indicate that the printer is connected, has paper, and is ready to print. Therefore, with the additional information provided by the search software and the diagnostic software, the knowledge Engineer might conclude that the printer interface circuit card is defective, preventing the printer from printing, while indicating that the printer is ready to print.

Once this determination is made, this solution is saved into the knowledgebase for future identification of the circuit card problem.

Figure 2:
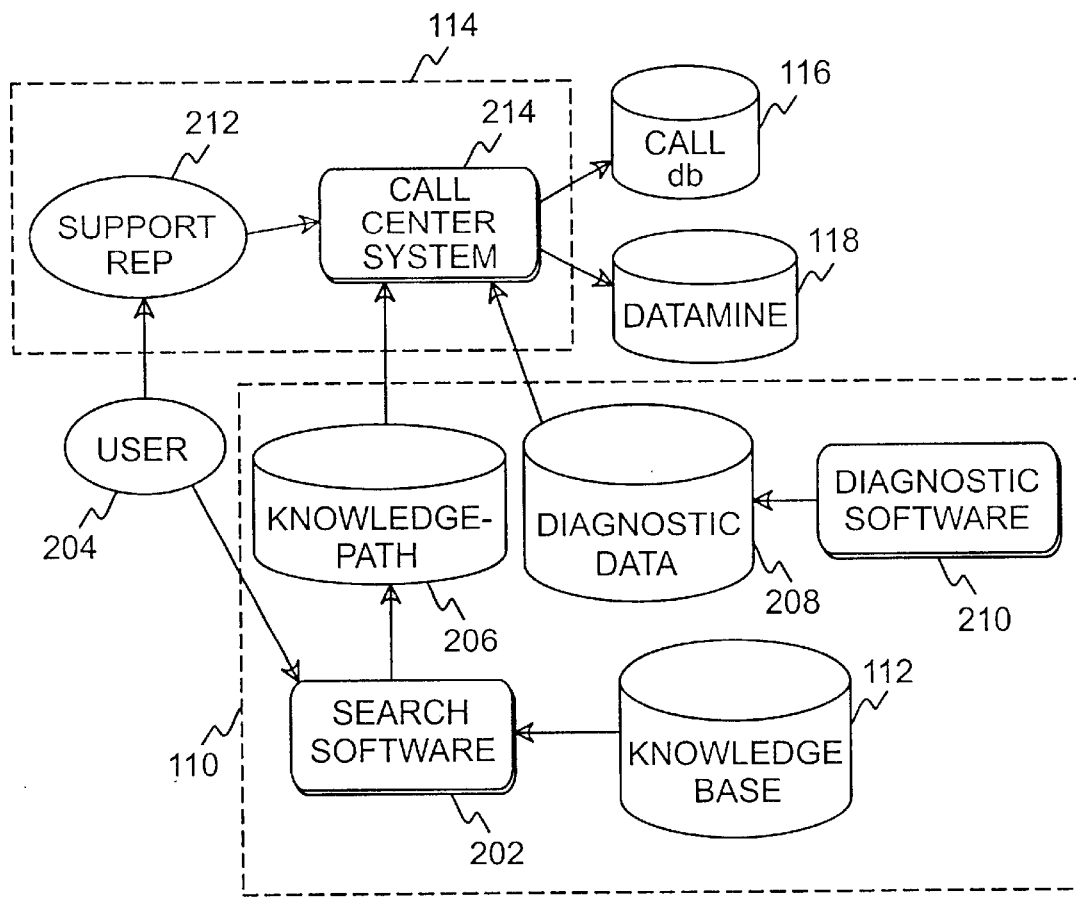
FIG. 2 shows a block diagram of collecting and storing information into the call database and datamine databases of the present invention.

FIG. 2 shows a block diagram of the process of collecting and storing information into the call database and the datamine database of the present invention. Referring now to FIG. 2, when a user 204 determines that a problem exists, the user 204 uses search software 202 within the user computer 110 (also shown in FIG. 1) to access a knowledgebase 112 (also shown in FIG. 1) in attempt to find a solution to the problem. As the search software 202 traverses the knowledgebase 112, in response to answers provided by the user 204, it saves the knowledge search paths that are traversed through the knowledgebase 112 into a knowledgepath file 206. For example, in response to a question "did the text print on the page", the user would respond yes or no. Each of these responses will lead the search software to a different area of the database, and each response would be saved in the knowledgepath file 206. Answers to questions typically produce other questions through the search software 202, and the culmination of all the questions and answers to each problem being searched will be stored in the knowledgepath file 206 as a knowledge search path. If the user is unable to resolve the problem, the user 204 will call the support center 114 and be connected to a support representative 212. Through a call center computer system 214, the support rep 212 will input a textual description of the problem given to the support rep 212 by the user 204. This textual description of the problem will be stored in the call database 116. In addition, during the session, the user computer system 110 will upload the knowledgepath file 206 into the call center computer system 214 where the knowledge search path information will be stored into the datamine 118.

In addition to using the search software 202 to search the knowledgebase 112, the user 204 may also perform certain diagnostic software 210 which analyzes the user computer system 112 to further collect data about the problem. Diagnostic software 210 stores the collected data into a diagnostic data file 208. When the knowledgepath information 206 is uploaded to the call center computer system 214 and stored in the datamine 118, the call center computer system 214 also uploads the diagnostic data 208 and stores this data into the datamine 118. As discussed previously, information in the datamine 118 and the call database 116 are connected through a common call identifier so that this information remains connected throughout the remainder of the process. Therefore, after the support call, the call database 116 and the datamine 118 contain both the human supplied information description of the problem, supplied by the user 204, and the machine supplied data collected about the problem in the form of the knowledgepath file 206 and the diagnostic data file 208.

Figure 3:
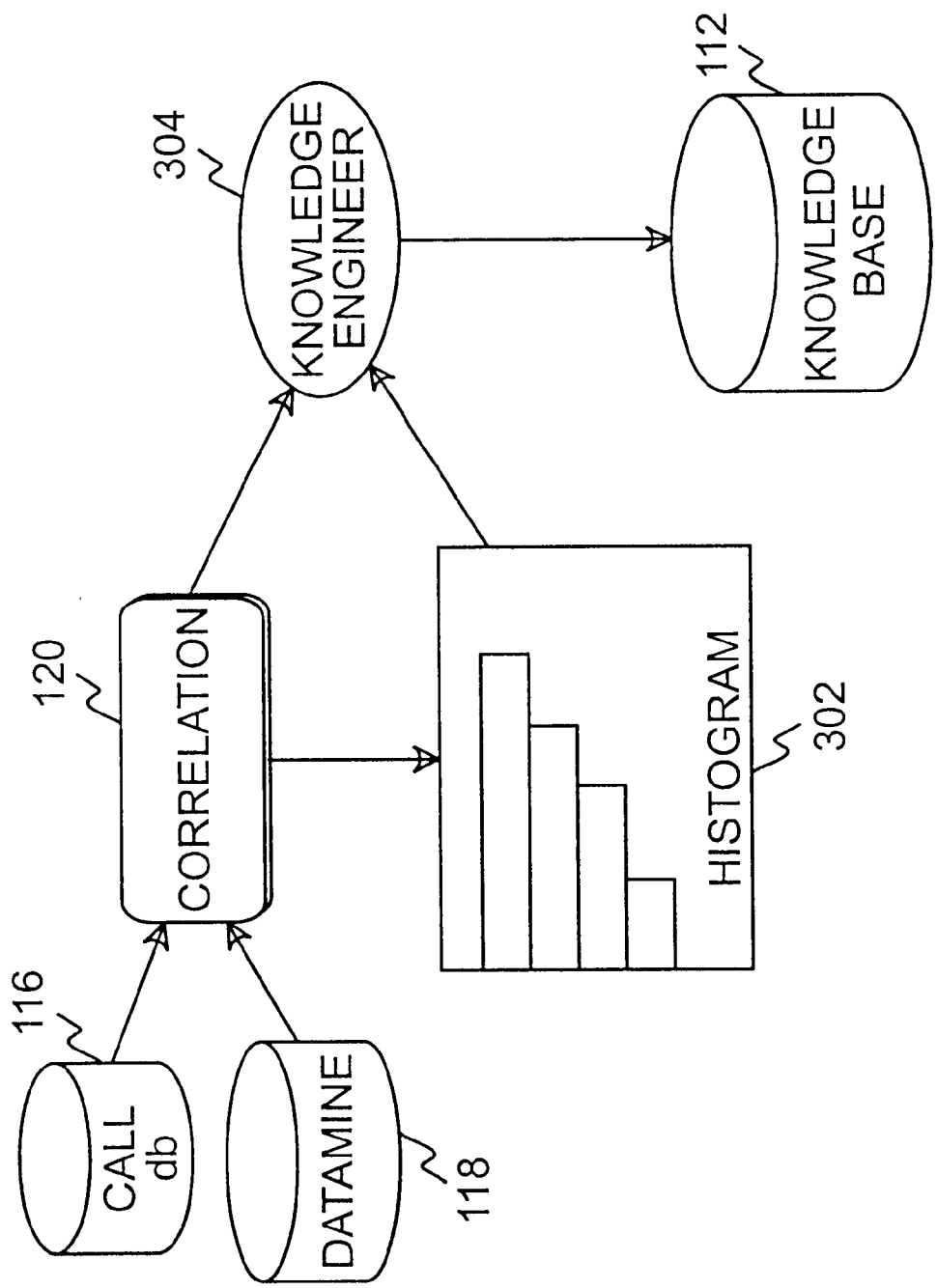
FIG. 3 shows a block diagram of correlating and analyzing the data from the call databases and the datamine database to create new entries into the knowledgebase.

FIG. 3 shows a block diagram of correlating and analyzing the data from the call databases and the datamine database to create new entries into the knowledgebase. Referring now to FIG. 3, data from the call database 116 and the datamine database 118 is input to the correlation function 120. Typically, the correlation is done in software within a computer system, by analyzing the combination of the knowledgepath data collected as the user traversed through the knowledgebase, and the diagnostic data produced by the diagnostic software. By comparing the path traversed through the knowledgebase, and the data collected by the diagnostic software, correlation software 120 can correlate information from multiple problem reports to determine that they represent the same problem.

Since identical problems can sometimes have different symptoms, the path traversed through the knowledgebase, and the diagnostic information may sometimes differ even for the same problem. Therefore, in addition to the software correlation of the data, a knowledge engineer 304 also analyzes the data to assist in the correlation. This may be done using knowledge the knowledge engineer has from previously examining similar problems, or it may be done by setting up a computer system to recreate the symptom described by the user.

As the analysis of multiple problems is complete, the correlation software 120 produces a histogram 302 identifying the most frequently occurring problems.

The knowledge engineer 304 uses the correlation information from the correlation software 120 and the histogram information from the histogram 302 to develop solutions to the most frequently occurring problems and return those solutions to the knowledgebase 112 thus completing a feedback loop to the user 204 (FIG. 2).

Figure 4:
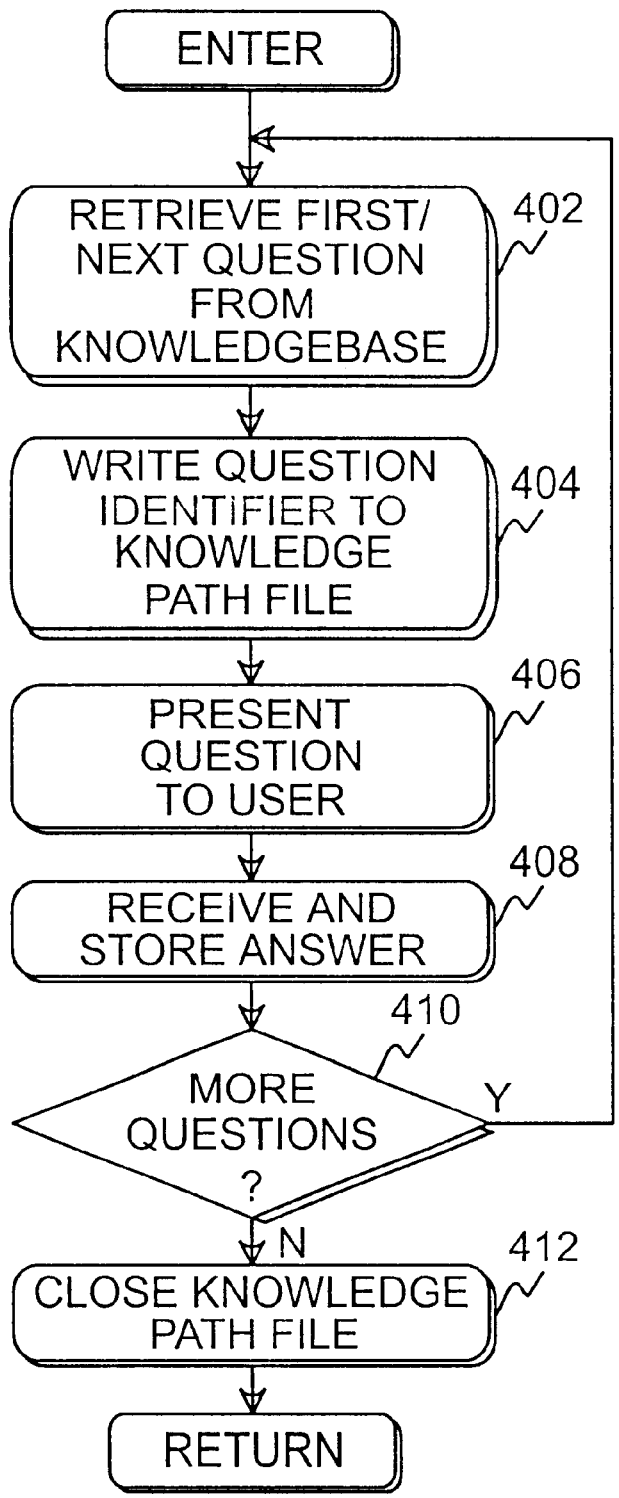
FIG. 4 shows a block diagram of the search software module that collects the knowledgepath information.

FIG. 4 shows a flowchart of a portion of the search software 202 used to create the knowledgepath 206. Referring now to FIG. 4, after entry step 402 retrieves the first or next question from the knowledgebase. Step 404 then writes the question identifier to the knowledgepath file. The question identifier will be a unique number or sequence of characters that identifies every question within the knowledgebase. Although the question text could also be stored to the knowledgepath file, typically a question identifier would be easier for the correlation software to analyze once the problem is returned to the support center.

Step 406 then presents the question to the user and step 408 receives the answer to the question. Step 408 also writes the answer to the question to the knowledgepath file. Thus, the combination of all the questions asked and all their answers comprises the knowledgepath used later in the correlation process.

Based upon the answers supplied by the user in step 408, step 410 determines whether there are more questions to ask the user or whether there is a solution to be presented. If there are more questions to be asked, step 410 returns to step 402 which presents the next question to the user.

After all questions have been asked, step 410 goes to step 412 which closes the knowledgepath file so that it can be transmitted to the support center.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A method for correlating data to identify like problems in a computer system, said method comprising the steps of:

(a) collecting knowledgepath data indicating a knowledge search path traversed by search software as said search software traverses a knowledgebase of data about a plurality of problems, said collecting being performed by search software used to access said knowledgebase;

(b) storing said knowledge search path data in a first database;

(c) correlating said knowledge search path data from said plurality of problems to identify like problems; and (d) storing a description of said like problems in said knowledgebase.

2. The method for correlating data to identify like problems in a computer system of claim 1, further comprising the following step (a1) performed after step (a), the following step (b1) performed after step (b), and the following step (c1) performed after step (c):

(a1) collecting diagnostic data indicating a machine state, said collecting being performed by diagnostic software contained within or attached to said machine having said machine state; and (b1) storing said diagnostic data in said first database; and (c1) correlating said diagnostic data with said knowledge search path data to said like problems.

3. The method for correlating data to identify like problems in a computer system of claim 2, further comprising the following steps (a2) and (a3) performed after step (a1) and the following step (c2) performed after step (c1):

(a2) collecting description data indicating problem symptoms from a user of said machine (a3) storing said description data in a second database; and (c2) correlating said description data to with knowledge search path data and said diagnostic data to said like problems.

4. The method for correlating data to identify like problems in a computer system of claim 3, further comprising the following step (c1) performed after step (c) and (d1) performed after step (d):

(c1) developing a histogram showing a frequency of problem occurrence; and (d1) storing only said correlated data of problems having a highest frequency of occurrence in said knowledgebase.

5. The method for correlating data to identify like problems in a computer system of claim 1, further comprising the following steps (a1) and (a2) performed after step (a) and the following step (c1) performed after step (c):

(a1) collecting description data indicating problem symptoms from a user of said machine (a2) storing said description data in a second database; and (c1) correlating said description data to with knowledge search path data to said like problems.

6. The method for correlating data to identify like problems in a computer system of claim 1, further comprising the following step (c1) preformed after step (c) and (d1) performed after step (d):

(c1) developing a histogram showing a frequency of problem occurrence; and (d1) storing only said correlated data of problems having a highest frequency of occurrence in said knowledgebase.

7. A computer system for correlating data to identify like problems in a system being diagnosed for a cause of failure, said computer system comprising:

search software executing within said computer system for traversing paths within a knowledgebase to locate any known solution to a plurality of problems being diagnosed and for collecting knowledgepath data indicating at least one knowledge search path traversed for each problem being diagnosed;

file storage software executing within said computer system for storing said at least one knowledge search path for each problem being diagnosed in a knowledgepath data file;

a correlation system for correlating said knowledge search paths from said plurality of problems to identify like problems and to produce a correlated problem description for each like problem; and knowledgebase storage software for storing said correlated problem description of said like problems in said knowledgebase.

8. The computer system for correlating data to identify like problems in a system being diagnosed for a cause of failure of claim 7 further comprising:

diagnostic software for collecting diagnostic data indicating a machine state for each of said problems being diagnosed and for storing said diagnostic data in a diagnostic data file; and a second correlating system for correlating said diagnostic data with said knowledge search path data to produce an enhanced correlated problem description for each like problem.

9. The computer system for correlating data to identify like problems in a system being diagnosed for a cause of failure of claim 8 further comprising:

description collecting software executing within said computer system for collecting description data indicating problem symptoms from a user of said system being diagnosed and storing said description in a description file;

a third correlating system for correlating said description data with said knowledge search path data and said diagnostic data to produce an enhanced correlated problem description for each like problem.

10. The computer system for correlating data to identify like problems in a system being diagnosed for a cause of failure of claim 9 further comprising:

histogram software for developing a histogram showing a frequency of occurrence of each of said problems being diagnosed; and limiting software within said knowledgebase storage software for storing only said correlated data of problems having a highest frequency of occurrence in said knowledgebase.

11. The computer system for correlating data to identify like problems in a system being diagnosed for a cause of failure of claim 7 further comprising:

description collecting software executing within said computer system for collecting description data indicating problem symptoms from a user of said system being diagnosed and storing said description in a description file;

a second correlating system for correlating said description data with said knowledge search path data to produce an enhanced correlated problem description for each like problem.

12. The computer system for correlating data to identify like problems in a system being diagnosed for a cause of failure of claim 7 further comprising:

histogram software for developing a histogram showing a frequency of occurrence of each of said problems being diagnosed; and limiting software within said knowledgebase storage software for storing only said correlated data of problems having a highest frequency of occurrence in said knowledgebase.

* * * * *